(12) United States Patent
Matsuno (10) Patent No.: US 9,369,623 B2
(45) Date of Patent: Jun. 14, 2016

(54) REMOTE-CONTROL APPARATUS AND CONTROL METHOD THEREOF, IMAGE CAPTURING APPARATUS AND CONTROL METHOD THEREOF, AND SYSTEM

(71) Applicant: CANON KABUSHIKI KAISHA, Tokyo (JP)

(72) Inventor: Keisuke Matsuno, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/445,361

(22) Filed: Jul. 29, 2014

(65) Prior Publication Data

US 2015/0036013 A1    Feb. 5, 2015

(30) Foreign Application Priority Data

Jul. 31, 2013 (JP) ................................. 2013-159713

(51) Int. Cl.
*H04N 5/232*    (2006.01)

(52) U.S. Cl.
CPC ....... *H04N 5/23203* (2013.01); *H04N 5/23216* (2013.01); *H04N 5/23293* (2013.01)

(58) Field of Classification Search
CPC .......... H04N 5/23203; H04N 5/23206; H04N 5/23293; H04N 7/185; H04N 5/23216
See application file for complete search history.

(56) References Cited

U.S. PATENT DOCUMENTS

| | | | | |
|---|---|---|---|---|
| 2011/0043663 A1* | 2/2011 | Tsuchiya | ............... | H04N 5/232 348/240.3 |
| 2011/0105179 A1* | 5/2011 | Tanabe | .............. | H04M 1/72533 455/556.1 |
| 2013/0107062 A1* | 5/2013 | Okazaki | ............. | H04N 5/23203 348/207.1 |
| 2014/0198229 A1* | 7/2014 | Morimoto | .......... | H04N 5/23219 348/211.8 |

FOREIGN PATENT DOCUMENTS

| | | |
|---|---|---|
| JP | 06-022193 A | 1/1994 |
| JP | 2010-062834 A | 3/2010 |

* cited by examiner

*Primary Examiner* — Paul Berardesca
(74) *Attorney, Agent, or Firm* — Cowan, Liebowitz & Latman, P.C.

(57) ABSTRACT

A remote-control apparatus which remotely controls an image capturing apparatus, comprises a communication unit configured to communicate with the image capturing apparatus; a reception unit configured to receive video data and a parameter obtained at the time of shooting of video from the image capturing apparatus via the communication unit; a display unit configured to display the video data; a designation unit configured to designate an area of the video displayed by the display unit; an acquisition unit configured to acquire predetermined information from video data of the designated area; and a transmission unit configured to transmit the predetermined information and the parameter to the image capturing apparatus via the communication unit.

22 Claims, 8 Drawing Sheets

REMOTE-CONTROL APPARATUS AND CONTROL METHOD THEREOF, IMAGE CAPTURING APPARATUS AND CONTROL METHOD THEREOF, AND SYSTEM

BACKGROUND OF THE INVENTION

1. Field of the Invention

The present invention relates to a technique of remotely controlling an image capturing apparatus.

2. Description of the Related Art

Japanese Patent Laid-Open No. 06-022193, for example, describes a technique in which in accordance with the time difference between transmission and display of video, a camera control apparatus for remotely controlling a television camera corrects an operation position when an operator manually operates a camera while viewing the video. Furthermore, Japanese Patent Laid-Open No. 2010-062834 describes a technique in which a system for remotely controlling a camera transmits, to a camera, the setting information of an optical system corresponding to video displayed when a zooming operation or focus operation is stopped, and returns the setting of the optical system on the camera side, so as to obtain a zooming state or focus state desired by an operator without any influence of a communication delay.

The techniques described in Japanese Patent Laid-Open Nos. 06-022193 and 2010-062834 are appropriate for a case in which the operator manually operates the movement of the camera but have the following problem when reading out image information from a specific region of the displayed video to control the camera based on the image information. That is, for example, when adjusting the brightness of a region designated on the display screen of a remote-control apparatus, even if the position information of the designated region is transmitted to the camera side, an object may have already moved outside the designated region due to a communication delay, thereby disabling adjustment of the brightness of the object according to the operator's intention. Similarly, in a case other than adjustment of the brightness, such a problem is expected to arise when operating the camera based on the image information of the specific region on the display screen.

SUMMARY OF THE INVENTION

The present invention has been made in consideration of the aforementioned problems, and realizes a technique of obtaining a control result according to the operator's intention without any influence of a communication delay when remotely controlling an image capturing apparatus based on information obtained from a specific region designated on the display screen of a remote-control apparatus.

In order to solve the aforementioned problems, the present invention provides a remote-control apparatus which remotely controls an image capturing apparatus, comprising: a communication unit configured to communicate with the image capturing apparatus; a reception unit configured to receive video data and a parameter obtained at the time of shooting of video from the image capturing apparatus via the communication unit; a display unit configured to display the video data; a designation unit configured to designate an area of the video displayed by the display unit; an acquisition unit configured to acquire predetermined information from video data of the area designated by the designation unit; and a transmission unit configured to transmit the predetermined information and the parameter to the image capturing apparatus via the communication unit.

In order to solve the aforementioned problems, the present invention provides an image capturing apparatus which is controllable by a remote-control apparatus, comprising: an imaging unit; a communication unit configured to communicate with the remote-control apparatus; a transmission unit configured to transmit video data and a parameter obtained at the time of shooting of video to the remote-control apparatus via the communication unit; a reception unit configured to receive communication data from the remote-control apparatus via the communication unit; an acquisition unit configured to acquire a parameter and predetermined information obtained from a designated area of the video data, which are included in the communication data received by the reception unit; and a control unit configured to generate control data using the predetermined information and the parameter which are acquired by the acquisition unit, and control the imaging unit based on the control data.

In order to solve the aforementioned problems, the present invention provides a control method of a remote-control apparatus which remotely controls an image capturing apparatus, the method comprising the steps of: receiving video data and a parameter obtained at the time of shooting of video from the image capturing apparatus via a communication unit configured to communicate with the image capturing apparatus; designating an area of video displayed on a display unit; acquiring predetermined information from video data of the designated area; and transmitting the predetermined information and the parameter to the image capturing apparatus via the communication unit.

In order to solve the aforementioned problems, the present invention provides a control method of an image capturing apparatus which is controllable by a remote-control apparatus, the method comprising the steps of: transmitting video data and a parameter obtained at the time of shooting of video to the remote-control apparatus via a communication unit configured to communicate with the remote-control apparatus; receiving communication data from the remote-control apparatus via the communication unit; acquiring the parameter and predetermined information obtained from a designated area of the video data, which are included in the received communication data; and generating control data using the predetermined information and the parameter which are acquired, and controlling an imaging unit based on the control data.

In order to solve the aforementioned problems, the present invention provides a system which causes a remote-control apparatus to remotely control an image capturing apparatus, wherein the remote-control apparatus comprises a communication unit configured to communicate with the image capturing apparatus, a reception unit configured to receive video data and a parameter obtained at the time of shooting of video from the image capturing apparatus via the communication unit, a display unit configured to display the video data, a designation unit configured to designate an area of the video displayed by the display unit, a generation unit configured to generate a parameter by acquiring predetermined information from video data of the area designated by the designation unit, and a transmission unit configured to transmit the predetermined information and the parameter to the image capturing apparatus via the communication unit, and wherein the image capturing apparatus comprises an imaging unit, a communication unit configured to communicate with the remote-control apparatus, a transmission unit configured to transmit video data and a parameter obtained at the time of shooting of video to the remote-control apparatus via the communication unit, a reception unit configured to receive communication data from the remote-control apparatus via the communication unit, an acquisition unit configured to acquire a parameter and predetermined information obtained from a designated area of the video data, which are included in the communication data received by the reception unit, and a control unit configured to generate control data using the predetermined information and the parameter which are acquired by the acquisition unit, and control the imaging unit based on the control data.

According to the present invention, it is possible to obtain a control result according to the operator's intention without any influence of a communication delay when remotely controlling an image capturing apparatus based on information obtained from a specific region designated on the display screen of a remote-control apparatus.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

An embodiment will be described below in which the present invention is implemented by a system formed by communicably connecting an image capturing apparatus such as a video camera and a remote-control apparatus such as a smartphone. Note that the present invention is not limited to this. For example, the remote-control apparatus can be implemented by an information processing apparatus such as a mobile phone, a portable media player, a so-called tablet device, or a personal computer (PC).

[Overview]

In a conventional system, the operator cannot operate an image capturing apparatus at an intended timing due to the influence of a communication delay in some cases. Assume, for example, that when designating a specific object region on a touch panel to fix focus on a touched object or execute exposure control or color correction, the designated object has already moved when touched. In this case, another object may exist in the designated region. The image capturing apparatus side unwantedly performs focus control, exposure control, color correction, or the like for the other object different from the object intended by the operator, thereby disabling obtaining of a control result according to the operator's intention.

To solve this problem, a system according to the embodiment displays video successively transmitted from the image capturing apparatus side on the display screen of a remote-control apparatus, and remotely controls the image capturing apparatus based on predetermined information obtained from a specific object region designated by the operator on the display screen, so as to obtain a control result according to the operator's intention without any influence of a communication delay.

Figure 8:
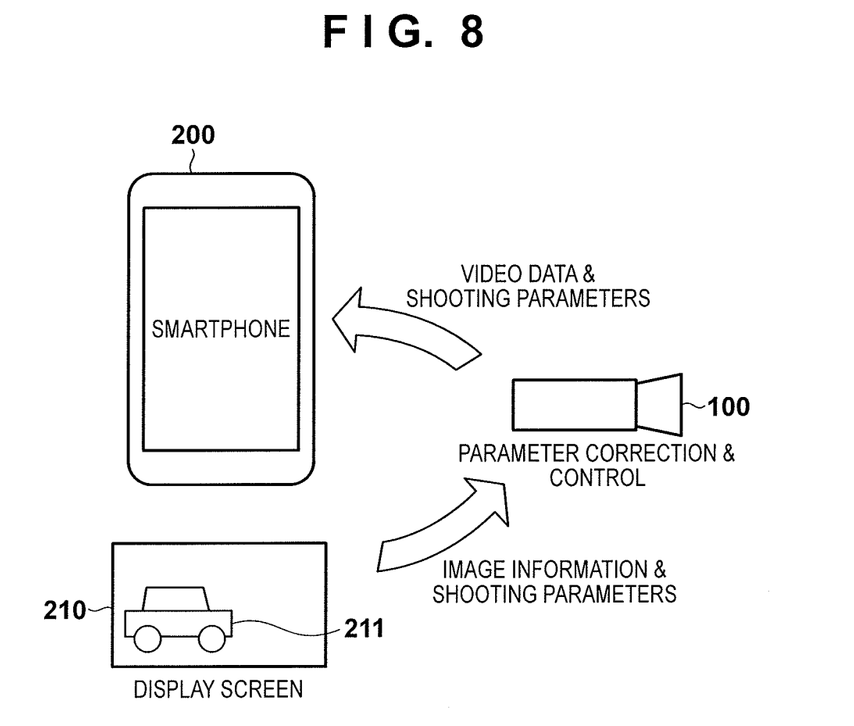
FIG. 8 is a view showing a system configuration according to the embodiment.

More specifically, as shown in FIG. 8, an image capturing apparatus 100 transmits video data (streaming data) and parameters (an exposure control value, a white balance control value, distance information, a frame number, and the like) obtained at the time of shooting of the video as communication data.

A remote-control apparatus 200 displays the video included in the communication data received from the image capturing apparatus 100, calculates information such as luminance data, color data, or distance information from an object region 211 touched on a display screen 210, and transmits the calculated information to the image capturing apparatus 100 together with the shooting parameters.

The image capturing apparatus 100 uses the information and shooting parameters received from the remote-control apparatus 200 to correct parameters for adjusting the brightness or color of the touched object region to a desired level, thereby calculating control data.

The image capturing apparatus 100 performs exposure control (the charge accumulation time of an image sensor, gain correction in signal processing, a stop, and a light attenuation filter), color correction, focus control, or the like in accordance with the calculated control data.

As described above, when remotely controlling the image capturing apparatus based on the predetermined information obtained from the specific region designated on the display screen of the remote-control apparatus, it is possible to obtain a control result according to the operator's intention without any influence of a communication delay.

<Configuration of Image Capturing Apparatus>

An overview of the configuration and function of the image capturing apparatus according to the embodiment of the present invention will be described with reference to FIG. 1.

Figure 1:
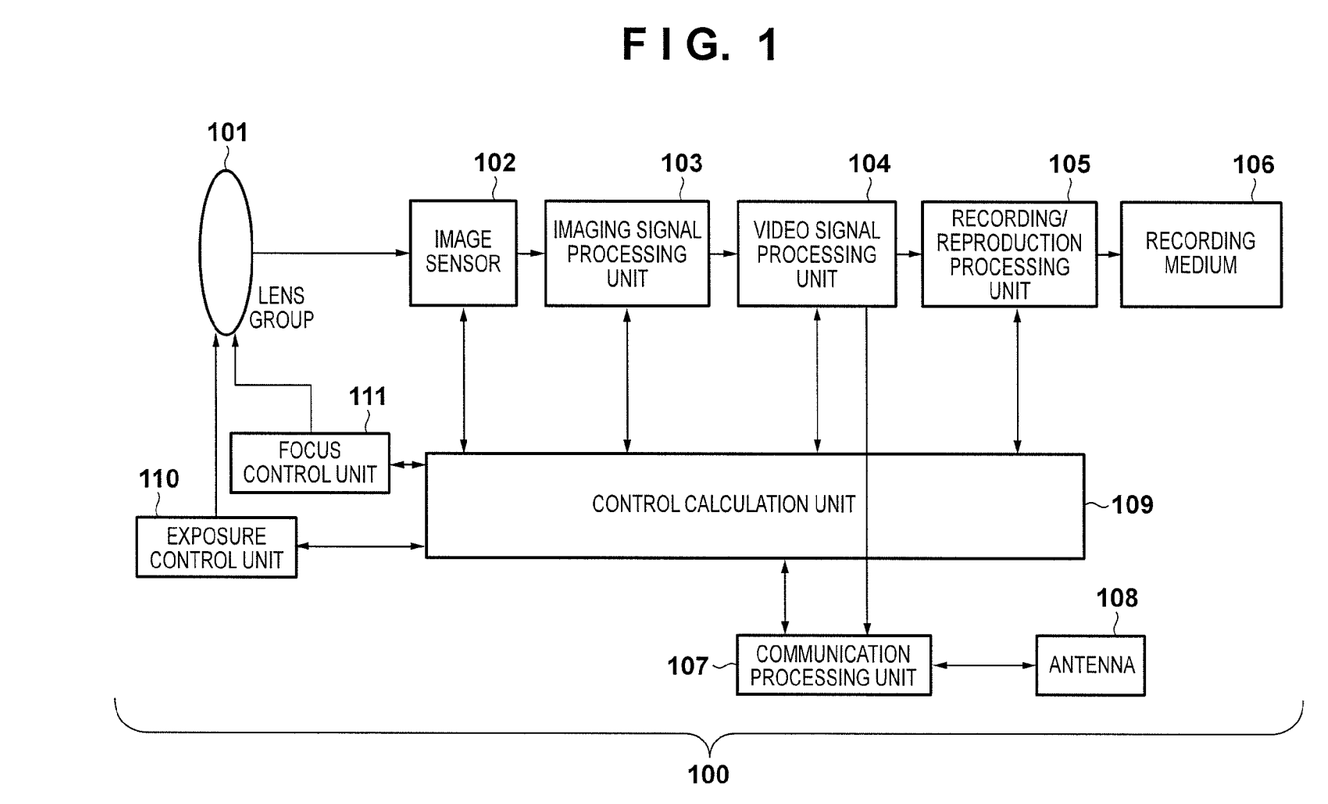
FIG. 1 is a block diagram showing the configuration of an image capturing apparatus according to an embodiment of the present invention.

Referring to FIG. 1, a lens group 101 includes a focusing lens, zoom lens, stop, and light attenuation filter. An optical image of an object, which has entered the lens group 101, is formed on the light-receiving surface of an image sensor 102 such as a CMOS sensor, and converted into an electrical signal to be output to an imaging signal processing unit 103.

The imaging signal processing unit 103 converts the analog signal obtained from the image sensor 102 into a digital signal, performs luminance correction such as gain correction, color correction such as white balance (WB) correction, and other signal processes, and outputs the resultant signal to a video signal processing unit 104.

The video signal processing unit 104 performs encoding processing for the video signal having undergone signal processing by the imaging signal processing unit 103, and outputs the thus obtained signal to a recording/reproduction processing unit 105.

For the video signal having undergone the encoding processing, the recording/reproduction processing unit 105 generates video data converted into a format appropriate for recording, and records the video data in a recording medium 106 such as a memory card. The recording medium 106 may be configured to be detachable from the apparatus, or may be incorporated in the apparatus.

Furthermore, the video signal processing unit 104 adds shooting parameters obtained at the time of shooting of the video data to the video data having undergone the encoding processing by the recording/reproduction processing unit 105, and outputs the resultant video data to the communication processing unit 107.

A communication processing unit 107 serves as a communication interface for connecting to an external apparatus such as the remote-control apparatus 200. The image capturing apparatus 100 can exchange data with an external apparatus via the communication processing unit 107. Note that in this embodiment, the communication processing unit 107 includes an interface for communicating with an external apparatus via an antenna 108 such as a wireless LAN.

The communication processing unit 107 converts the shooting parameters and the video data generated by the video signal processing unit 104 into a format appropriate for communication to generate communication data, thereby transmitting the communication data via the antenna 108.

On the other hand, the antenna 108 receives the communication data transmitted from the remote-control apparatus 200, and the communication processing unit 107 converts the received data into a format usable by the image capturing apparatus 100, thereby sending the resultant data to a control calculation unit 109.

An exposure control unit 110 performs exposure control by adjusting the charge accumulation time of the image sensor 102, the stop, the light attenuation filter, and the like in accordance with exposure control data received from the control calculation unit 109.

A focus control unit 111 drives the focusing lens to a predetermined position to focus on an object in accordance with focus control data received from the control calculation unit 109.

The control calculation unit 109 includes a CPU, nonvolatile memory (ROM), and work memory (RAM). The nonvolatile memory stores a control program of this embodiment to be executed by the control calculation unit 109. The nonvolatile memory also stores a program for communicating with the remote-control apparatus 200. The work memory is used as the work area of the control calculation unit 109 or a buffer memory for temporarily storing data processed by the image sensor 102, imaging signal processing unit 103, video signal processing unit 104, recording/reproduction processing unit 105, and communication processing unit 107. The control calculation unit 109 controls the operation of the overall apparatus by receiving information received by the communication processing unit 107 and various kinds of information from respective blocks.

<Configuration of Remote-Control Apparatus>

An overview of the configuration and function of the remote-control apparatus according to this embodiment will be described with reference to FIG. 2.

Figure 2:
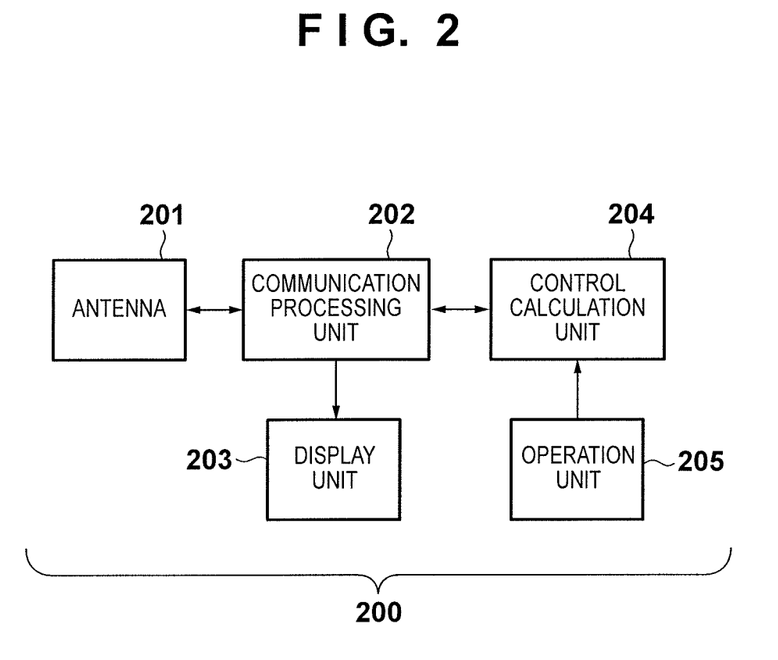
FIG. 2 is a block diagram showing the configuration of a remote-control apparatus according to the embodiment of the present invention.

Referring to FIG. 2, a communication processing unit 202 receives communication data from the remotely existing image capturing apparatus 100 via an antenna 201, and acquires video data, shooting parameters, and other information included in the communication data to send them to a control calculation unit 204.

The communication processing unit 202 outputs the video data received from the image capturing apparatus 100 to a display unit 203. The display unit 203 is comprised of an LCD and the like, and displays video data successively output from the communication processing unit 202, auxiliary information such as shooting parameters, the state information of the camera, and the like.

An operation unit 205 includes a touch panel for accepting a user operation. Upon accepting a user operation, the operation unit 205 sends an operation signal to the control calculation unit 204. The user operation includes an operation of designating a specific object region in video to adjust the brightness or color in exposure control or WB control, and an operation of designating a specific object region in video to adjust the focal length so as to focus on the object region in focus control.

The control calculation unit 204 includes a CPU, nonvolatile memory (ROM), and work memory (RAM). The nonvolatile memory stores a program to be executed by the control calculation unit 204. The work memory is used as the work area of the control calculation unit 204 or a buffer memory for temporarily storing data processed by the communication processing unit 202. A program for communicating with the image capturing apparatus 100 is also stored in the nonvolatile memory, and installed as a remote-control application. Note that the processing of the remote-control apparatus 200 of this embodiment is implemented by loading a program provided by the remote-control application. Note that the remote-control application includes a program for using the basic function of an OS installed in the remote-control apparatus 200.

The control calculation unit 204 causes the communication processing unit 202 to receive the video data and shooting parameters, acquires information such as luminance data, color data, or object distance information from the video data of the specific object region designated by the operation unit 205 on the display screen, and transmits the acquired information to the image capturing apparatus 100.

<Shooting Control Processing by Remote Control>

Figures 3A, 3B:
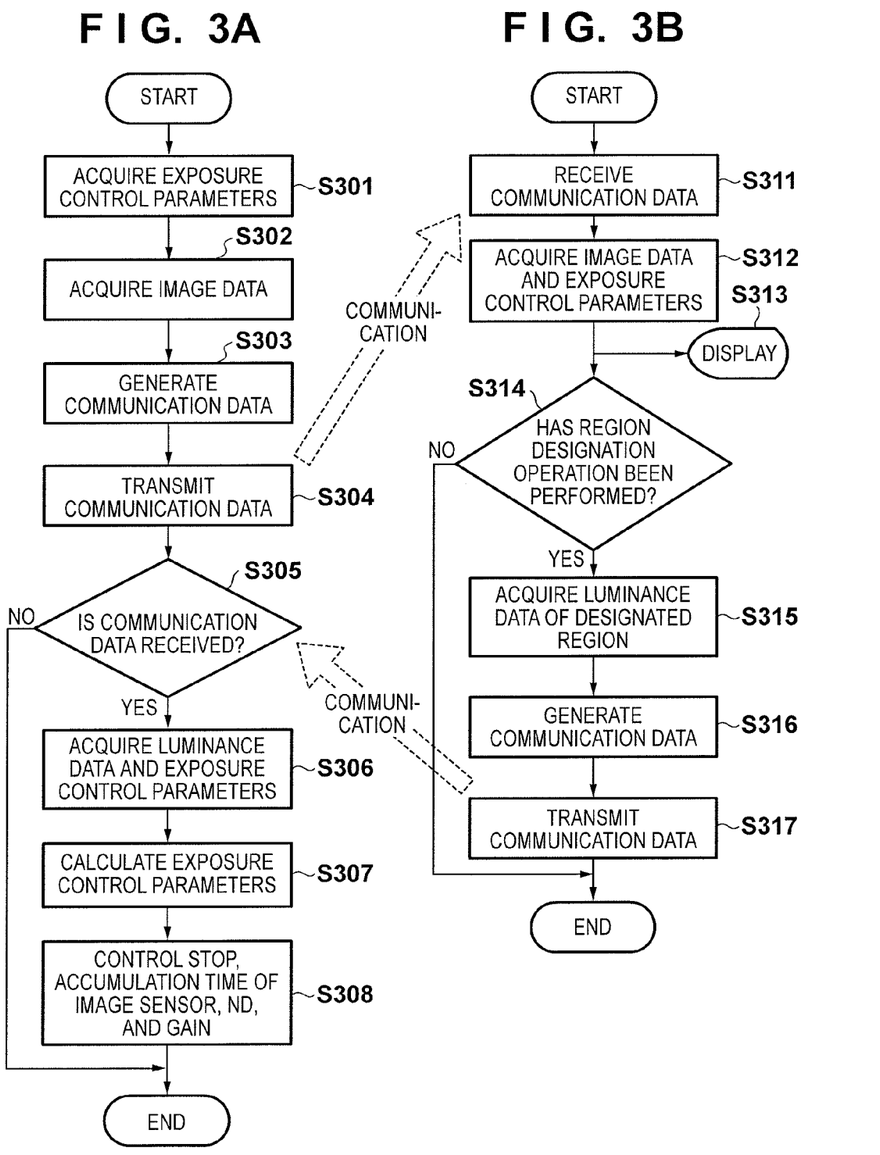
FIGS. 3A and 3B are flowcharts illustrating shooting control processing by remote control according to the first embodiment.

The first embodiment in which an image capturing apparatus 100 (FIG. 3A) and a remote-control apparatus 200 (FIG. 3B) which form the system of the embodiment perform exposure control will be described with reference to FIGS. 3A and 3B. Note that processing shown in FIG. 3A is implemented when a control calculation unit 109 of the image capturing apparatus 100 executes an operation signal and control program. Processing shown in FIG. 3B is implemented when a control calculation unit 204 of the remote-control apparatus 200 executes the program of a remote-control application according to an operation signal and program.

The processes shown in FIGS. 3A and 3B start when the programs of the image capturing apparatus 100 and remote-control apparatus 200 are activated and these apparatuses are communicably connected to each other.

Referring to FIG. 3A, in step S301, the control calculation unit 109 of the image capturing apparatus 100 acquires exposure control parameters used for the charge accumulation time of an image sensor 102, the gain processing of an imaging signal processing unit 103, and control of a stop and light attenuation filter by an exposure control unit 110.

In step S302, the control calculation unit 109 acquires video data having undergone encoding processing by the video signal processing unit 104.

In step S303, the control calculation unit 109 causes a communication processing unit 107 to convert the exposure control parameters acquired in step S301 and the video data acquired in step S302 into a format appropriate for communication, thereby generating communication data.

In step S304, the control calculation unit 109 transmits the communication data generated in step S303 to the remote-control apparatus 200.

In step S311 of FIG. 3B, a communication processing unit 202 of the remote-control apparatus 200 receives the communication data transmitted by the image capturing apparatus 100 as described above.

In step S312, the control calculation unit 204 acquires the video data and exposure control parameters from the communication data received in step S311. In step S313, the control calculation unit 204 displays the video data on a display unit 203.

In step S314, the control calculation unit 204 determines whether an operation signal for designating a specific region on the display screen has been input from an operation unit 205. If no operation signal has been input, the remote-control apparatus 200 terminates the process, and the image capturing apparatus 100 also terminates the process since no communication data is received in step S305.

On the other hand, processing when it is determined in step S314 that an operation signal has been input will be explained.

If the coordinates of one point have been designated by a user operation, in step S315 the control calculation unit 204 of the remote-control apparatus 200 acquires luminance data in a predetermined area centered at the coordinates. Alternatively, if a region has been designated, the control calculation unit 204 acquires luminance data of the region. The luminance data may indicate the average value of the luminance values of a plurality of regions obtained by dividing the designated region, or histogram information indicating the maximum and minimum values and distribution of the luminance values.

In step S316, the control calculation unit 204 causes the communication processing unit 202 to convert the luminance data acquired in step S315 and the exposure control parameters into a format appropriate for communication, thereby generating communication data. In step S317, the control calculation unit 204 transmits the communication data to the image capturing apparatus 100.

In step S305 of FIG. 3A, the communication processing unit 107 of the image capturing apparatus 100 receives the communication data transmitted by the remote-control apparatus 200 as described above.

In step S306, the control calculation unit 109 of the image capturing apparatus 100 acquires the luminance data and exposure control parameters from the communication data received in step S305.

In step S307, the control calculation unit 109 calculates exposure control data using the luminance data and exposure control parameters acquired in step S306 so that the brightness of the specific object region designated by the operation unit 205 is set to predetermined brightness (for example, correct exposure).

In step S308, the control calculation unit 109 sends the exposure control data calculated in step S307 to the exposure control unit 110, thereby performing exposure control.

If the luminance data indicates the average luminance value and the brightness of the object is set to a correct value, the exposure control data calculated in step S307 can be calculated by calculating, from the difference with respect to the correct luminance value, an exposure step to be corrected, and correcting the exposure control parameters acquired in step S306.

Second Embodiment

Shooting control processing by remote control according to the second embodiment will be described with reference to FIGS. 4A and 4B.

In the first embodiment, a case in which the exposure control of the image capturing apparatus 100 is performed has been explained. However, the present invention is applicable to white balance (WB) control by changing some of the processing contents. The second embodiment in which the system of the present invention performs WB control will be described by paying attention to the differences from the first embodiment. That is, in this embodiment, white balance control parameters are used as shooting parameters, instead of the exposure control parameters.

Note that the configurations and communication modes of an image capturing apparatus 100 and remote-control apparatus 200 of this embodiment are the same as those in the first embodiment and a description thereof will be omitted.

Figure 4A:
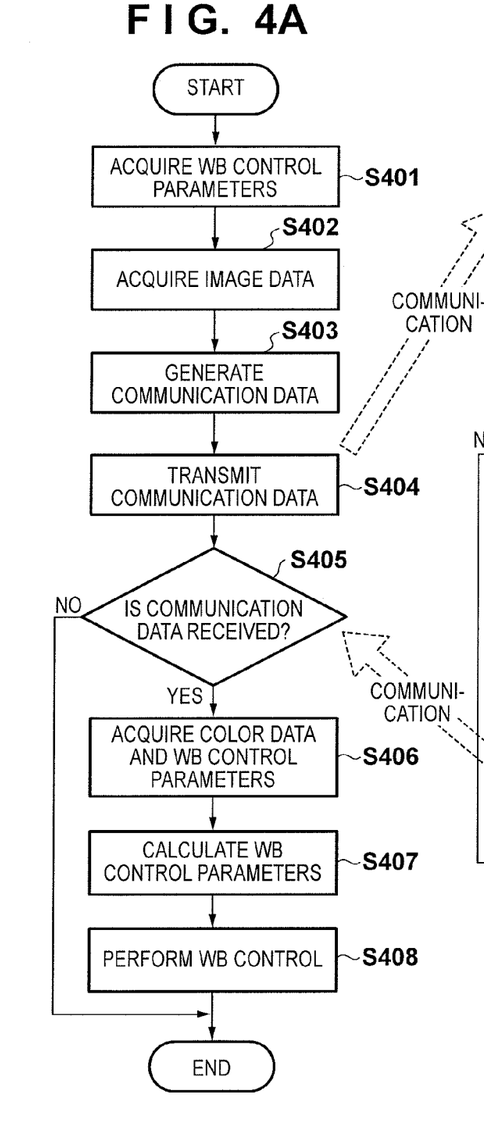
FIGS. 4A and 4B are flowcharts illustrating shooting control processing by remote control according to the second embodiment.
Figure 4B:
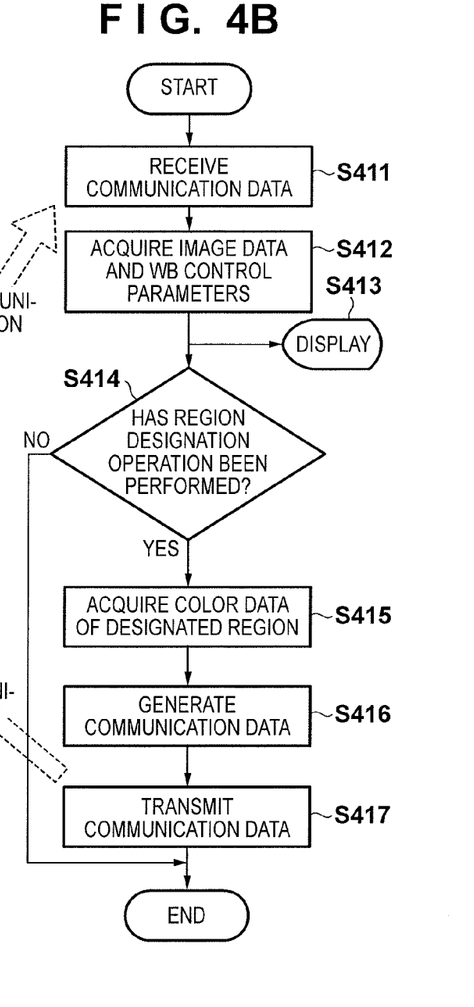

Referring to FIGS. 4A and 4B, WB control parameters acquired in step S401 are gain values for RGB image signals or color difference signals.

In step S415, data acquired in step S415 from a specific object region designated by an operation unit 205 is color data instead of the luminance data. The color data includes average color difference values or average RGB values. Alternatively, the color data may indicate the average values of the color difference values or RGB values of pixels within a predetermined color gamut.

In step S407, a control calculation unit 109 uses the color data and WB control parameters acquired in step S406 to calculate white balance control data so that the color of the specific object region designated by the operation unit 205 is set to a predetermined color. If, for example, the WB control parameters are gain values for RGB signals and the color data indicates color difference signals, in order to adjust the color of the object to white, control calculation unit 109 calculates gain values for RGB values so that the color difference signals R-Y and B-Y of the color data are set to 0, and corrects the WB control parameters acquired in step S406.

In step S408, the control calculation unit 109 causes an imaging signal processing unit 103 to execute WB processing for an imaging signal in accordance with the WB control data calculated in step S407.

Third Embodiment

Shooting control processing by remote control according to the third embodiment will be described with reference to FIGS. 5A and 5B.

In the aforementioned first embodiment, a case in which the exposure control of the image capturing apparatus 100 is performed has been explained. However, the present invention is applicable to focus control by changing some of the processing contents. The third embodiment in which the system of the present invention performs focus control will be described by paying attention to the differences from the first embodiment. That is, in this embodiment, distance information to an object is used as a shooting parameter instead of the exposure control parameters.

Note that the configurations and communication modes of an image capturing apparatus 100 and remote-control apparatus 200 of this embodiment are the same as those in the first embodiment and a description thereof will be omitted.

Figure 5A:
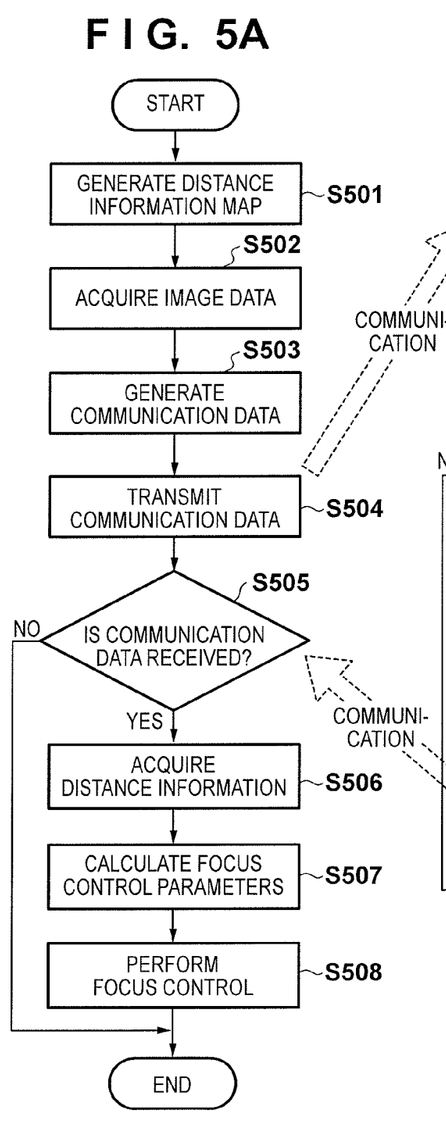
FIGS. 5A and 5B are flowcharts illustrating shooting control processing by remote control according to the third embodiment.
Figure 5B:
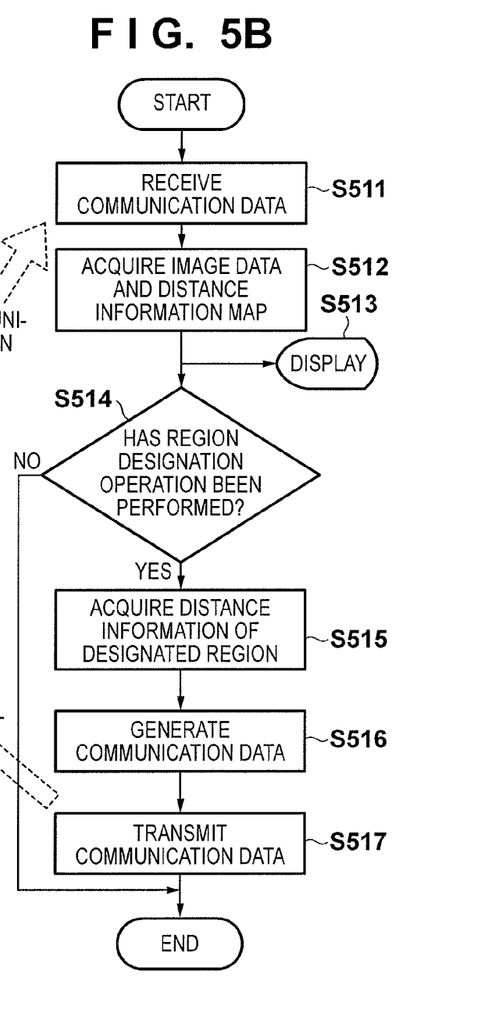

Referring to FIGS. 5A and 5B, in step S501, an imaging signal processing unit 103 acquires distance information to the object for each pixel of an imaging signal or each of a plurality of regions obtained by dividing an imaging screen, thereby generating a distance information map.

In step S515, a control calculation unit 204 of the remote-control apparatus 200 acquires the distance information of a specific object designated by a user operation from the distance information map generated in step S501.

In step S516, the control calculation unit 204 causes a communication processing unit 202 to convert the distance information acquired in step S515 into a format appropriate for communication, thereby generating communication data.

In step S507, a control calculation unit 109 uses the distance information acquired in step S506 to calculate focus control data which causes the specific object designated by an operation unit 205 to be in focus.

In step S508, the control calculation unit 109 sends the focus control data calculated in step S507 to a focus control unit 111, thereby performing focus control.

Fourth Embodiment

Shooting control processing by remote control according to the fourth embodiment will be described with reference to FIGS. 6A and 6B.

In the aforementioned first to third embodiments, the image capturing apparatus 100 transmits the exposure control parameters, WB control parameters, or object distance information used to perform shooting to the remote-control apparatus 200. The similar processing can be performed by transmitting the frame number of video data instead of them. The fourth embodiment in which the system of the present invention uses a frame number will be described by paying attention to the differences from the first to third embodiments.

Note that the configurations and communication modes of an image capturing apparatus 100 and remote-control apparatus 200 of this embodiment are the same as those in the first to third embodiments and a description thereof will be omitted.

Figure 6A:
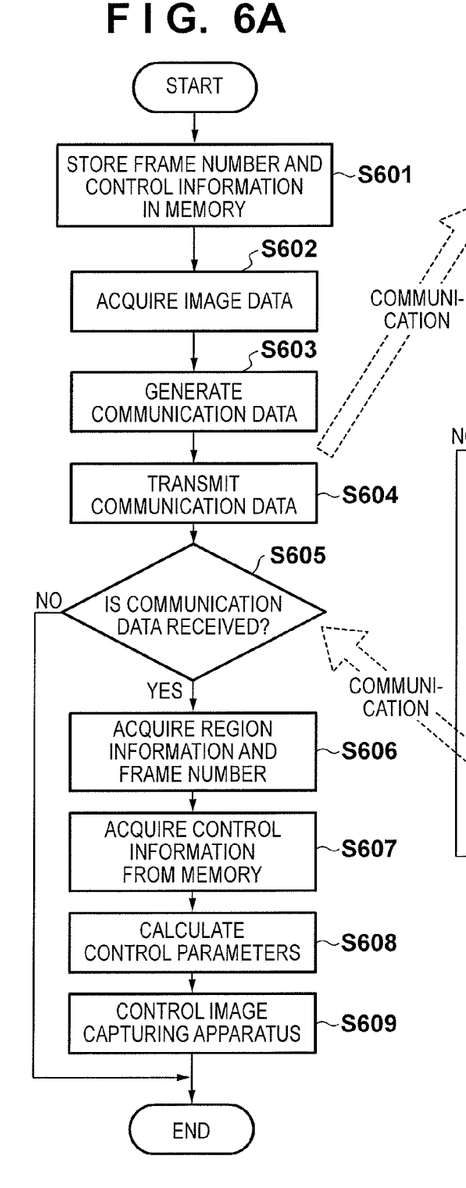
FIGS. 6A and 6B are flowcharts illustrating shooting control processing by remote control according to the fourth embodiment.
Figure 6B:
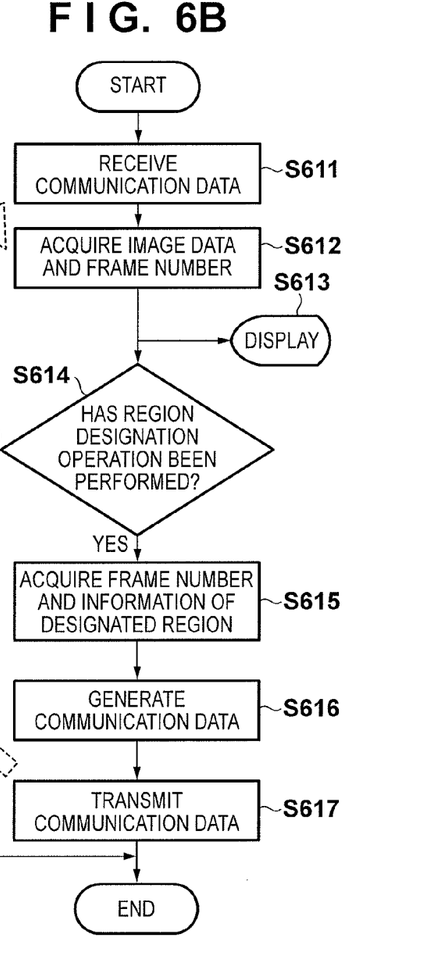

Referring to FIGS. 6A and 6B, in step S601, a control calculation unit 109 of the image capturing apparatus 100 temporarily stores, in a work memory, control information obtained at the time of shooting of each frame of video data in association with a frame number. Note that the number of frames to be stored in the memory is set to have enough of a margin that takes into consideration the delay time due to round-trip communication. If, for example, the delay time due to round-trip communication is at most 3 sec at the time of shooting of 30 frames per sec, pieces of control information for about 100 frames including a margin may be stored, and the preceding data may be deleted. Note that the control information indicates exposure control parameters for exposure control, white balance control parameters for WB control, or a distance information map for focus control.

In step S603, the control calculation unit 109 causes a communication processing unit 107 to convert the video data and frame number into a format appropriate for communication, thereby generating communication data. In step S604, the control calculation unit 109 transmits the communication data to the remote-control apparatus 200.

In step S615, a control calculation unit 204 of the remote-control apparatus 200 acquires the frame number and the information of a specific object region designated by a user operation. The acquired information indicates luminance data for exposure control, color data for WB control, or coordinate information for focus control. These pieces of information will be collectively referred to as region information hereinafter.

In step S616, the control calculation unit 204 causes a communication processing unit 202 to convert the region information and frame number into a format appropriate for communication. In step S617, the control calculation unit 204 transmits the converted data to the image capturing apparatus 100.

In step S606, the control calculation unit 109 acquires the region information and frame number from the communication data received by the communication processing unit 107 of the image capturing apparatus 100 from the remote-control apparatus 200.

In step S607, the control calculation unit 109 acquires, from the memory, control information corresponding to the frame number acquired in step S606.

In step S608, the control calculation unit 109 uses the control information and region information acquired from the memory to calculate control data for performing appropriate control. In step S609, the control calculation unit 109 controls each unit. When, for example, performing exposure control, the luminance data as the region information and the exposure control parameters as the control information are used to calculate appropriate exposure control data, as described in the first embodiment. When performing WB control, the color data and WB control parameters are used to calculate appropriate WB control data, as described in the second embodiment. Furthermore, when performing focus control, the coordinate information of the specific object region and the object distance information of the distance information map are acquired to calculate appropriate focus control data, as described in the third embodiment.

Fifth Embodiment

Shooting control processing by remote control according to the fifth embodiment will be described with reference to FIGS. 7A and 7B.

In the aforementioned fourth embodiment, the remote-control apparatus 200 acquires the information of the specific object region, and the image capturing apparatus 100 calculates appropriate control data. However, the remote-control apparatus 200 can calculate control data. The fifth embodiment in which a remote-control apparatus 200 calculates control data in the system of the present invention will be described by paying attention to the differences from the fourth embodiment.

Note that the configurations and communication modes of an image capturing apparatus 100 and the remote-control apparatus 200 of this embodiment are the same as those in the first to third embodiments and a description thereof will be omitted.

Figures 7A, 7B:
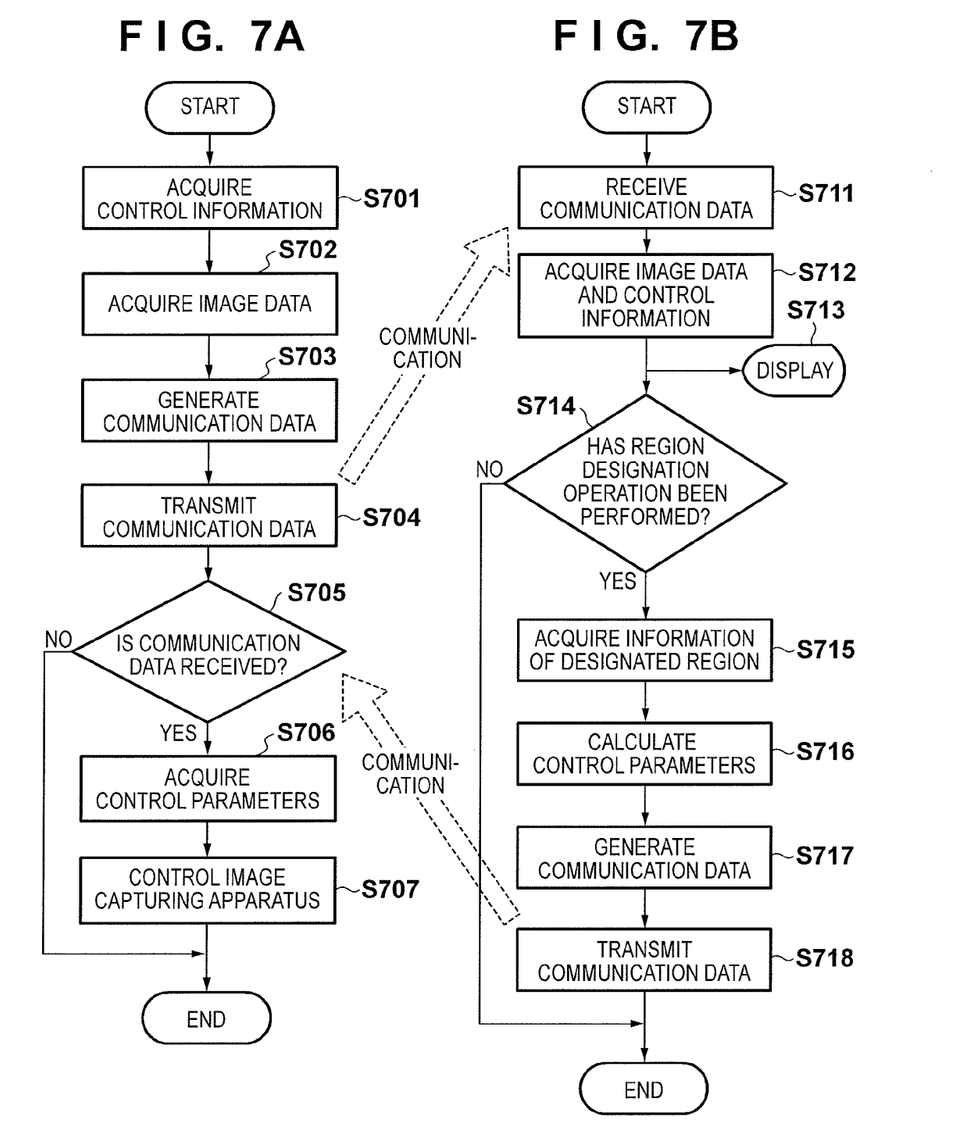
FIGS. 7A and 7B are flowcharts illustrating shooting control processing by remote control according to the fifth embodiment.

Referring to FIGS. 7A and 7B, in step S701, a control calculation unit 109 of the image capturing apparatus 100 acquires, as control information, exposure control parameters for performing exposure control, WB control parameters for performing WB control, or a distance information map for performing focus control.

In step S703, the control calculation unit 109 causes a communication processing unit 107 to convert video data and the control information into communication data. In step S704, the control calculation unit 109 transmits the communication data to the remote-control apparatus 200.

In step S715, a control calculation unit 204 of the remote-control apparatus 200 acquires the information of a specific object region designated by a user operation. The acquired region information indicates luminance data for exposure control, color data for WB control, or object distance information for focus control.

In step S716, the control calculation unit 204 calculates appropriate control data from the control information acquired in step S712 and the region information acquired in step S715. The control calculation unit 204 causes a communication processing unit 202 to convert the control data into communication data in step S717, and transmits the communication data to the image capturing apparatus 100 in step S718. Calculation of the control data for each of exposure control, WB control, and focus control is as described in each of the aforementioned embodiments.

In step S706, the communication processing unit 107 of the image capturing apparatus 100 acquires control data from the communication data received from the remote-control apparatus 200. In step S707, the control calculation unit 109 controls each unit.

Note that in each of the aforementioned embodiments, if it takes time to reflect the result of a user operation on displayed video, an icon for notifying the operator that processing is in progress or the like may be displayed on a display unit 203.

As described above, according to the embodiment, when remotely controlling the image capturing apparatus 100 based on the information of a specific object region designated on the display screen of the remote-control apparatus 200, it is possible to perform control according to the operator's intention without any influence of a communication delay.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159713, filed Jul. 31, 2013 which is hereby incorporated by reference herein in its entirety.

What is claimed is:

1. A remote-control apparatus which remotely controls an image capturing apparatus, comprising:
a communication unit configured to communicate with the image capturing apparatus;
a reception unit configured to receive video data and a parameter obtained at the time of shooting of video from the image capturing apparatus via the communication unit;
a display unit configured to display the video data;
a designation unit configured to designate an area of the video displayed by the display unit;
an acquisition unit configured to acquire predetermined information from video data of the area designated by the designation unit; and
a transmission unit configured to transmit the predetermined information and the parameter to the image capturing apparatus via the communication unit.

2. The apparatus according to claim 1, wherein
the parameter is an exposure control value at the time of shooting of each frame of the video data, and
the predetermined information is luminance data or luminance histogram information.

3. The apparatus according to claim 1, wherein
the parameter is a white balance control value at the time of shooting of each frame of the video data, and
the predetermined information is color data.

4. The apparatus according to claim 1, wherein
the parameter is object distance information at the time of shooting of each frame of the video data.

5. The apparatus according to claim 2, wherein
the reception unit receives a frame number of the video data instead of the parameter, and
the transmission unit transmits the predetermined information and the frame number to the image capturing apparatus.

6. The apparatus according to claim 3, wherein
the reception unit receives a frame number of the video data instead of the parameter, and
the transmission unit transmits the predetermined information and the frame number to the image capturing apparatus.

7. The apparatus according to claim 4, wherein
the reception unit receives a frame number of the video data instead of the parameter, and
the transmission unit transmits the predetermined information and the frame number to the image capturing apparatus.

8. The apparatus according to claim 1, further comprising
a calculation unit configured to calculate control data by correcting the parameter based on the predetermined information,
wherein the transmission unit transmits the control data calculated by the calculation unit to the image capturing apparatus.

9. The apparatus according to claim 1, further comprising
a notification unit configured to notify a user that processing is in progress until video obtained by the image capturing apparatus based on control data is displayed by the display unit.

10. An image capturing apparatus which is controllable by a remote-control apparatus, comprising:
an imaging unit;
a communication unit configured to communicate with the remote-control apparatus;
a transmission unit configured to transmit video data and a parameter obtained at the time of shooting of video to the remote-control apparatus via the communication unit;

a reception unit configured to receive communication data from the remote-control apparatus via the communication unit;

an acquisition unit configured to acquire a parameter and predetermined information obtained from a designated area of the video data, which are included in the communication data received by the reception unit; and a control unit configured to generate control data using the predetermined information and the parameter which are acquired by the acquisition unit, and control the imaging unit based on the control data.

11. The apparatus according to claim 10, wherein
the parameter is an exposure control value at the time of shooting of each frame of the video data,
the predetermined information is luminance data or luminance histogram information, and
the control data is exposure control data for adjusting brightness of an image in the designated area.

12. The apparatus according to claim 10, wherein
the parameter is a white balance control value at the time of shooting of each frame of the video data,
the predetermined information is color data, and
the control data is white balance control data for adjusting a color of an image in the designated area.

13. The apparatus according to claim 10, wherein
the parameter is object distance information at the time of shooting of each frame of the video data, and
the control data is focus control data for causing an object in the designated area to be in focus.

14. The apparatus according to claim 10, further comprising
a calculation unit configured to calculate the control data by correcting the parameter based on the predetermined information acquired by the acquisition unit.

15. The apparatus according to claim 14, wherein
the transmission unit transmits a frame number of the video data instead of the parameter,
the control unit includes a storage unit storing pieces of control information corresponding to frame numbers of a predetermined number of frames, and
the calculation unit calculates the control data using the control information corresponding to the frame number acquired from the storage unit.

16. The apparatus according to claim 11, wherein
the control data is an exposure control value which sets brightness of an object in the designated area to an appropriate value, and
includes control data for a charge accumulation time of an image sensor, gain correction in signal processing, a stop, and a light attenuation filter.

17. The apparatus according to claim 12, wherein
the control data is a white balance control value which sets a color of an object in the designated area to white.

18. A control method of a remote-control apparatus which remotely controls an image capturing apparatus, the method comprising the steps of:

receiving video data and a parameter obtained at the time of shooting of video from the image capturing apparatus via a communication unit configured to communicate with the image capturing apparatus;

designating an area of video displayed on a display unit;

acquiring predetermined information from video data of the designated area; and transmitting the predetermined information and the parameter to the image capturing apparatus via the communication unit.

19. A control method of an image capturing apparatus which is controllable by a remote-control apparatus, the method comprising the steps of:

transmitting video data and a parameter obtained at the time of shooting of video to the remote-control apparatus via a communication unit configured to communicate with the remote-control apparatus;

receiving communication data from the remote-control apparatus via the communication unit;

acquiring the parameter and predetermined information obtained from a designated area of the video data, which are included in the received communication data; and generating control data using the predetermined information and the parameter which are acquired, and controlling an imaging unit based on the control data.

20. A system which causes a remote-control apparatus to remotely control an image capturing apparatus,
wherein the remote-control apparatus comprises
a communication unit configured to communicate with the image capturing apparatus,
a reception unit configured to receive video data and a parameter obtained at the time of shooting of video from the image capturing apparatus via the communication unit,
a display unit configured to display the video data,
a designation unit configured to designate an area of the video displayed by the display unit,
a generation unit configured to generate a parameter by acquiring predetermined information from video data of the area designated by the designation unit, and
a transmission unit configured to transmit the predetermined information and the parameter to the image capturing apparatus via the communication unit, and
wherein the image capturing apparatus comprises
an imaging unit,
a communication unit configured to communicate with the remote-control apparatus,
a transmission unit configured to transmit video data and a parameter obtained at the time of shooting of video to the remote-control apparatus via the communication unit,
a reception unit configured to receive communication data from the remote-control apparatus via the communication unit,
an acquisition unit configured to acquire a parameter and predetermined information obtained from a designated area of the video data, which are included in the communication data received by the reception unit, and
a control unit configured to generate control data using the predetermined information and the parameter which are acquired by the acquisition unit, and control the imaging unit based on the control data.

21. A non-transitory computer-readable storage medium storing a program for causing a computer to execute the control method according to claim 18.

22. A non-transitory computer-readable storage medium storing a program for causing a computer to execute the control method according to claim 19.

* * * * *